United States Patent
Strauss et al.

(10) Patent No.: US 8,749,550 B1
(45) Date of Patent: Jun. 10, 2014

(54) DISPLAY OF REPLICATED GEOGRAPHIC DATA USING A HIERARCHICAL DATA STRUCTURE

(75) Inventors: Paul Steven Strauss, Sunnyvale, CA (US); Christopher Co, San Jose, CA (US)

(73) Assignee: Google Inc., Mountain View, CA (US)

(*) Notice: Subject to any disclaimer, the term of this patent is extended or adjusted under 35 U.S.C. 154(b) by 154 days.

(21) Appl. No.: 13/305,628

(22) Filed: Nov. 28, 2011

(51) Int. Cl.
*G06T 15/00* (2011.01)

(52) U.S. Cl.
USPC ............ 345/419; 345/418; 345/428; 345/581

(58) Field of Classification Search
USPC .................................. 345/419, 418, 428, 581
See application file for complete search history.

(56) References Cited

U.S. PATENT DOCUMENTS 7,680,350 B2 * 3/2010 Baxes ........................... 382/248
2002/0163515 A1 * 11/2002 Sowizral et al. .............. 345/419
2008/0016472 A1 * 1/2008 Rohlf et al. ................... 715/848

* cited by examiner

*Primary Examiner* — Daniel Hajnik
*Assistant Examiner* — Naveed Hasan
(74) *Attorney, Agent, or Firm* — Dority & Manning, P.A.

(57) ABSTRACT

An exemplary method for displaying replicated geographic data in a three-dimensional environment includes identifying a first node in a node tree including an instance set. The exemplary method also includes identifying a collection referenced by the instance set. The exemplary method further includes identifying a second node in the node tree including the collection referenced by the instance set, a depth of the first node in the node tree being greater than a depth of the second node in the node tree. The exemplary method also includes identifying a model in the collection, the model being referenced by the instance set and the instance set including location data for replicated instances in the instance set. The exemplary method further includes displaying the first node, where displaying the first node includes displaying model data in the collection at the locations specified by the instance set.

28 Claims, 8 Drawing Sheets

DISPLAY OF REPLICATED GEOGRAPHIC DATA USING A HIERARCHICAL DATA STRUCTURE

BACKGROUND

1. Field

This disclosure generally relates to geographic information systems (GIS) and in particular to displaying nodes in a three-dimensional environment.

2. Background

A GIS is a system for archiving, retrieving, displaying, or manipulating data indexed according to a data element's geographic coordinates. A data element may be a variety of data types such as, for example, satellite imagery, maps, models of buildings and terrain, and other geographic features. GIS applications communicate with a server to retrieve data that is requested for display on a client device.

A client device may display unique objects in a geographic information environment. For example, the client may display the White House at its designated address. In contrast, some objects that are displayed in the geographic information environment are not unique. These objects may appear multiple times at different locations within the geographic information environment. For example, thousands of trees in a forest may be displayed in the geographic information environment. The client device may take a long time to display these trees in a view that satisfies the user. Usability of GIS applications depends on displaying content quickly and smoothly.

BRIEF SUMMARY

Embodiments relate to methods for displaying geographic data in a three-dimensional environment. An exemplary method for displaying replicated geographic data in a three-dimensional environment includes identifying a first node in a node tree including an instance set. The first node is located within a field of view of a virtual camera that defines a perspective to view content of the three-dimensional environment. The exemplary method also includes identifying a collection referenced by the instance set. The exemplary method farther includes identifying a second node in the node tree including the collection referenced by the instance set. A depth of the first node in the node tree is greater than a depth of the second node in the node tree. The exemplary method also includes identifying a model in the collection. The model is referenced by the instance set, and the instance set includes location data for replicated instances in the instance set. The exemplary method further includes displaying the first node. Displaying the first node includes displaying model data in the collection at the locations specified by the instance set.

Another exemplary embodiment includes identifying a node in a node tree including an instance set. The node is located within a field of view of a virtual camera that defines a perspective to view content of the three-dimensional environment. The exemplary method also includes identifying a first level-of-detail and a second level-of-detail of a model referenced by the instance set in the node. The second level-of-detail has a higher resolution than the first level-of-detail. The exemplary method further includes identifying a maximum number of instances at the second level-of-detail to render in a frame period. The exemplary method also includes determining an estimated density of a scene. The scene includes nodes in the field of view of the virtual camera. Determining the estimated density of the scene may include determining an estimated density of the instance set in the node. The exemplary method further includes determining, for the frame period, an LOD distance from a location of the virtual camera to a boundary that separates an instance at the first level-of-detail from an instance at the second level-of-detail. The LOD distance is based at least on the maximum number of instances identified and the estimated density of the scene.

Another exemplary embodiment includes ingesting instances. Each instance includes instance location and a reference to a geographic model to be displayed at the instance location. The exemplary method also includes determining levels of detail in the node tree for instances based at least on a size of a model referenced by the instances. The exemplary method further includes distributing the instances to a set of nodes in the node tree at the corresponding levels of detail. The exemplary method also includes determining an ancestor node in the node tree for one or more nodes in the set of nodes. The exemplary method further includes generating a collection to be referenced by the ancestor node in the node tree. The collection includes geographic models referenced by the one or more nodes, and instances in the one or more nodes reference one or more models in the collection. The exemplary method also includes publishing the node tree with the collection and the instances. The published node tree may enable retrieval of models at relatively coarser levels of the node tree and retrieval of replicated instances at relatively finer levels of the node tree.

Other embodiments of these aspects include corresponding systems, apparatuses, and computer program products configured to perform the actions of these methods, encoded on computer storage devices.

Further features and advantages of embodiments described herein, as well as the structure and operation of various embodiments, are described in detail below with reference to the accompanying drawings. It is noted that the embodiments described below are not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS/FIGURES

Embodiments are described with reference to the accompanying drawings. The accompanying drawings, which are incorporated herein and form a part of the specification, illustrate embodiments and, together with the description, further serve to explain the principles of the embodiments and to enable a person skilled in the relevant art to make and use the embodiments. In the drawings, like reference numbers may indicate identical or functionally similar elements. The drawing in which an element first appears is generally indicated by the left-most digit in the corresponding reference number.

DETAILED DESCRIPTION

Figure 1:
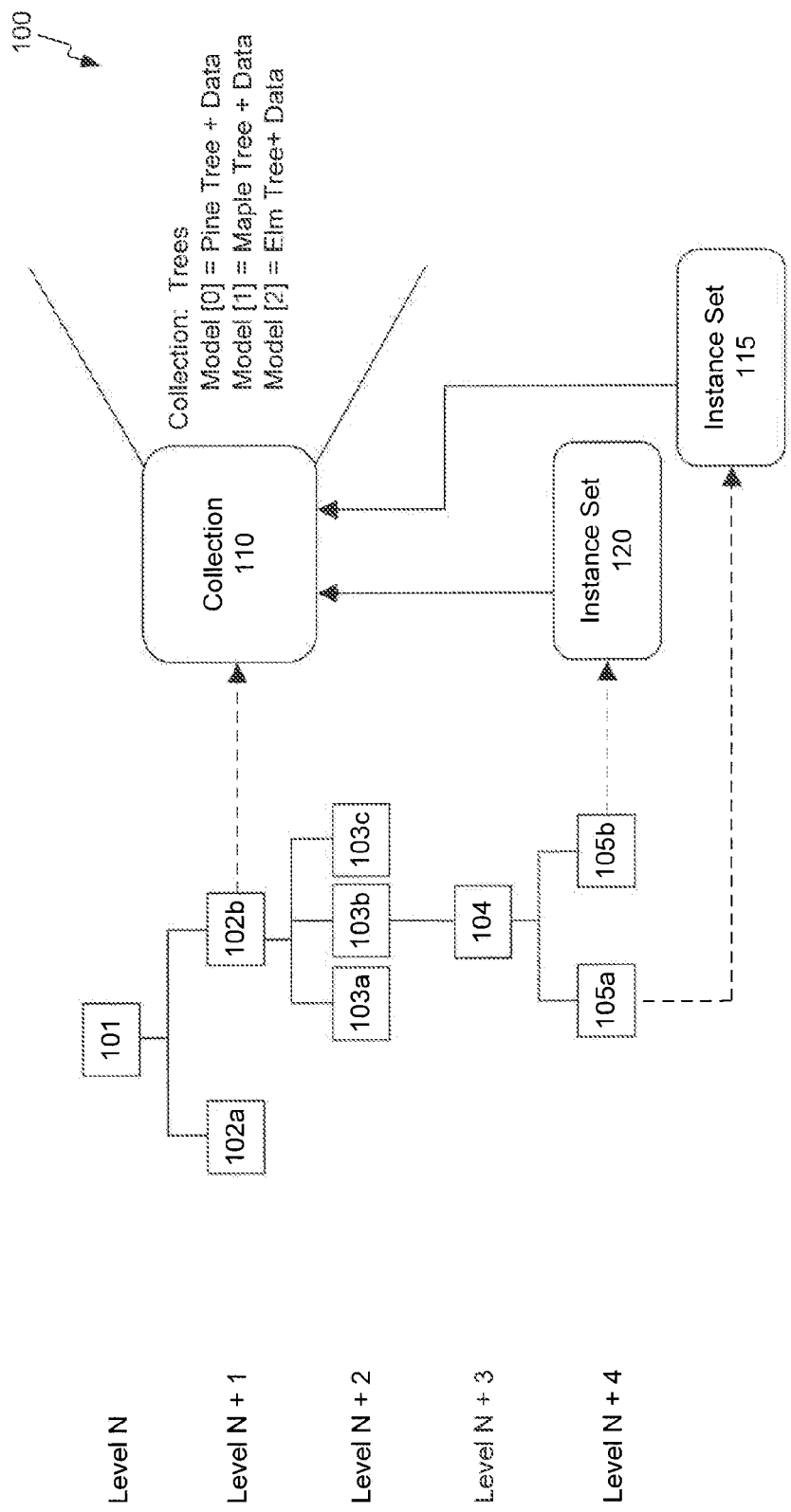
FIG. 1 shows an exemplary node tree.

I. Overview
II. Node Tree
A. Tree Representation
B. Display Replicated Objects in a Geographical Information Environment
III. Levels of Detail
A. Static LOD Distance
B. Dynamic LOD Distance
  1. LOD Distance Separates Different LOD Instances
  2. Maximum Number of Instances at Higher Resolution LOD
  3. Density (ρ)
IV. Exemplary Client Architecture
V. Preprocess Node Tree
1. Ingestion
2. Distribution
3. Publish
4. Other Embodiments
VI. Geographic Data—Course and Fine Levels
VII. Exemplary Methods
VIII. Conclusion

I. Overview

This description generally relates to displaying geographic data in a tin ee-dimensional environment. A client may display a view of a planet (e.g., Earth) by displaying nodes in a node tree. Some views of the planet may include a same object or similar objects that are placed in different locations in the view. These objects may share texture and geometry data.

In an embodiment, replicated geometries representing objects are populated and displayed at multiple locations at a display of a client device. The similarities between objects may be exploited by replicating them in the geographic information environment. For example, a view of the Amazon rainforest may include replicating thousands of trees and populating them at different locations in the view. Techniques described in this disclosure may speed up scene resolution time and improve perceptual resolution quality. As a result, a user may have the perception that the scene is resolving faster.

For conciseness and convenience, this disclosure generally refers to replicating trees. It should be understood, however, that the term object, as used herein, includes three-dimensional models representing other natural and man-made structures, such as bus stops, lamp posts, and stop signs that may be replicated and populated in a view of a geographic information environment.

While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting, of the detailed description. Thus, the operational behavior of embodiments will be described with the understanding that modifications and variations of the embodiments are possible, given the level-of-detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

II. Node Tree

A. Tree Representation

Data associated with geographic information may be stored in a database characterized by a hierarchical data structure, such as a node tree data structure. A node tree is composed of nodes and leaves. A node is an element which has children node descendants. A node leaf, meanwhile, is a node element which has no children. An example of a node tree is a quad tree composed of quad nodes and quad leaves. A quad node is a data structure that may point to a payload of data and up to four references to other files. In a quad tree, each parent node has exactly four children descendants. A root node has exactly four children and each node may have four children. Each level of a quad tree possesses four times as many nodes as its previous level.

In an embodiment, a quad tree is used to partition a surface of the Earth into subregions. Each subregion may be bounded by latitude and longitude values. Images of the Earth may be rendered onto a geometry representing the Earth's terrain creating a three-dimensional model of the Earth.

FIG. 1 shows an exemplary node tree 100. Node tree 100 includes nodes at different levels of node tree 100. For example, node tree 100 includes node 101 at level N, nodes 102a-102b at level N+1, nodes 103a-103c at level N+2, node 104 at level N+3, and nodes 105a-105b at level N+4.

Nodes in node tree 100 may include, for example, collection, model, or instance data. A collection may represent a set of related geometric models that may be displayed at various geographic locations. A collection may include, for example, model data, texture data, and geometry data. For example, a collection may include a set of exemplar models representing objects to be replicated at various geographic locations in a three-dimensional environment.

An instance set includes one or more instances. An instance may specify which of the models in a collection to display and a location in which to display an instance of the model. Instances of a replicated object may be displayed in the environment at different locations. Multiple instances of various models may be displayed efficiently using a node tree that includes collection, model, and instance data.

B. Display Replicated Objects in a Geographical Information Environment

Nodes in node tree 100 contain data for replicating objects in a geographic information environment. When a node is within a field of view of a virtual camera, the node may be rendered in the geographic information environment. A field of view of a virtual camera defines a perspective to view content of a three-dimensional environment. If a node is within the field of view and includes replicated geographic data, the node may be identified as including an instance set. Node 105*a* in node tree 100 includes an instance set 115, and node 105*b* in node tree 100 includes an instance set 120. When instance set 115 is visible in the view, node 105*a* may be identified. Similarly, when instance set 120 is visible in the view, node 105*b* may be identified.

An instance references a collection and a specific model in the collection for display in the three-dimensional environment. For example, instance set 115 references a collection 110. Collection 110 includes a collection "Trees" having a set of exemplar tree models. The collection "Trees" includes three different species of trees: a pine tree model, a maple tree model, and an elm tree model.

A collection referenced by an instance set may be identified in various ways. For example, if a name of a collection is unique then an instance set may reference a collection by its name. In this example, the collection name "Trees" may be unique and instance set 115 may reference collection 110 by referring to the collection name "Trees."

After the collection referenced by the instance set is identified, the node including the collection is identified. The node including the collection may be an ancestor node of the node including the instance set. For example, node 102*b* is an ancestor node of node 105*a*. Node 102*b* may be identified by starting from node 105*a* and traversing node tree 100 up to root node 101 until a collection named "Trees" is identified. The traversal may include traversing up to node 104, node 103*b*, and node 102*b*. The traversal stops when the collection "Trees" is identified. Accordingly, node 102*b* is identified as including the collection "Trees."

Nodes in node tree 100 may be located at different depths of node tree 100. For example, nodes at level N+2 have a greater depth than nodes at levels N and N+1. Similarly, nodes at levels N and N+1 have a smaller depth than nodes at level N+2. Nodes at level N+2 have a smaller depth than nodes at levels N+3 and N+4. Similarly, nodes at levels N+3 and N+4 have a greater depth than nodes at level N+2.

A depth of a node including an instance set is greater than a depth of a node including the collection referenced by the instance set. For example, a depth of node 105*a* in node tree 100 is greater than a depth of node 102*b* in node tree 100. Similarly, a depth of a node including a collection is smaller than a depth of a node including the instance set that references the collection. For example, a depth of node 102*b* in node tree 100 is smaller than a depth of node 105*a* in node tree 100.

Instance set 115 may also reference a model in collection 110. The renderable data for a model may be a geometric mesh. A mesh may be a polygon mesh made up of polygons including, but not limited, to triangles. Mesh models may be used to generate a three-dimensional representation of an image.

A model referenced by an instance set may be identified in various ways. For example, the model set in collection 110 is indexed. Instance set 115 may reference an index of the model set to identify the model to display at various geographic locations. The index may be used to reference the corresponding model in the collection. For example, instance set 115 may use index 0 to reference the pine tree model, index 1 to reference the maple tree model, and index 2 to reference the elm tree model.

Model data may include, for example, geometry items and texture items. Geometry items may represent geometry for the model. Each geometry item may include an index of the model in a collection and a maximum display distance for a corresponding level-of-detail (LOD) represented by the model. Texture items may represent an image used as a texture in a model. Each texture item may include a name of the image.

An instance set may include a variety of additional information. For example, an instance set may include location data for replicated instances in the instance set. The location data is used to determine where to display a replicated object in the geographic information environment. Location data in the instance set may include latitude and longitude coordinates of instances in the instance set. For example, a tree instance may include latitude and longitude coordinates of a location of a replicated tree. In another example, a node including an instance may have a location (e.g., center of the node) and the instance has an offset value from that location. The offset may be used to determine where to display a replicated object using the center of the node as a reference point.

The location data may also include altitude data for the instance. The altitude of an object is generally at ground level. An altitude value of, for example, 0 or null may indicate that the object is at ground level. However, objects may have an altitude above ground. For example, a blimp in the air may have an altitude above ground. An altitude value of, for example, 360 for the blimp may indicate that the blimp is 360 meters above ground.

An instance set may also include instance orientation data, such as z-rotation data (rotation around the z (Up-Down) axis). The z-axis is perpendicular to the ground plane. For example, a z-rotation value may be used to display trees that are not lined up vertically. An instance set may also include scale data that specifies a scale from the ground center of the three-dimensional model. In other examples, in addition to scale other geometric parameters may indicate how to render the model for the instance.

Displaying a node including an instance set may include displaying the referenced model data in the collection, referenced by the instance set, at the locations specified by the instance set. For example, instance set 115 in node 105*a* may include five pine tree instances having location data for each pine tree. When instance set 115 comes into the field of view of the virtual camera, collection 110 along with the pine tree model is referenced by the instance set. The pine tree model is identified as an object to be replicated at various geographic locations. The location data in instance set 115 is used to determine where in the view to display the five pine trees.

In an embodiment, the node including the instance set does not include renderable data. In this embodiment, the node including the instance set (e.g., node 105*a*) cannot be rendered without referencing data in another node (e.g., node 102*b*). An instance may not include renderable data. As a result, the instance set may refer to renderable data in, for example, the collection.

A scene is a portion of the three-dimensional environment that is visible to a user. A scene may include all nodes in the field of view of the virtual camera. Data in the nodes within the virtual camera's field of view may be displayed in the scene.

A scene graph may represent all instances in an instance set. In an embodiment, a scene graph may be considered to be a representation that includes information about the geometry and appearance of all objects appearing on a graphical display. As an example, a scene graph may be a dynamic data structure within a computer program. A scene graph may include data that describes shape objects (geometry and appearance), geometric structure relationships (geometric transformations, ordering, and grouping), global objects (how all shape objects are viewed, e.g., viewpoints, lights, backgrounds), and behaviors (procedures for modifying information stored in a scene graph). Updates to a scene graph generated by the client device may be optimized by knowing whether objects of interest and nodes in the node tree have or have not changed since a last image frame was rendered. Generating and updating scene graphs may be based on LOD decisions. More details on LOD are below.

III. Levels of Detail

A model may have any number of LOD representations that may be displayed in a geographic information environment. For example, a model may have one, two, three, or more levels of detail (LODs). Accounting for an LOD of a model may increase or decrease the complexity of a three-dimensional object representation as a virtual camera moves closer to or farther from the object representation. For example, an instance at a first LOD of a model may be displayed at a lower resolution than an instance at a second LOD of the model. Rendering a lower resolution instance may be faster and less computationally intensive than rendering a higher resolution instance.

If only one LOD exists for a model, then an instance of the model may be rendered at that LOD with no additional LOD computations. In contrast, if more than one LOD exists for a model, an appropriate LOD of the model may be selected depending on a distance between the virtual camera and the instance. An instance of the model at the appropriate LOD may be displayed to the user. Different LODs may correspond to different resolutions. For example, a first LOD instance may have a lower resolution version of a model than a second LOD instance of the model. Determining which LOD instance to render may be determined statically or dynamically.

A. Static LOD Distance

An LOD distance is a distance at which a model representing an object may switch from being represented at a first LOD to being represented at a second LOD. In an embodiment, an LOD distance is determined statically.

Figure 2:
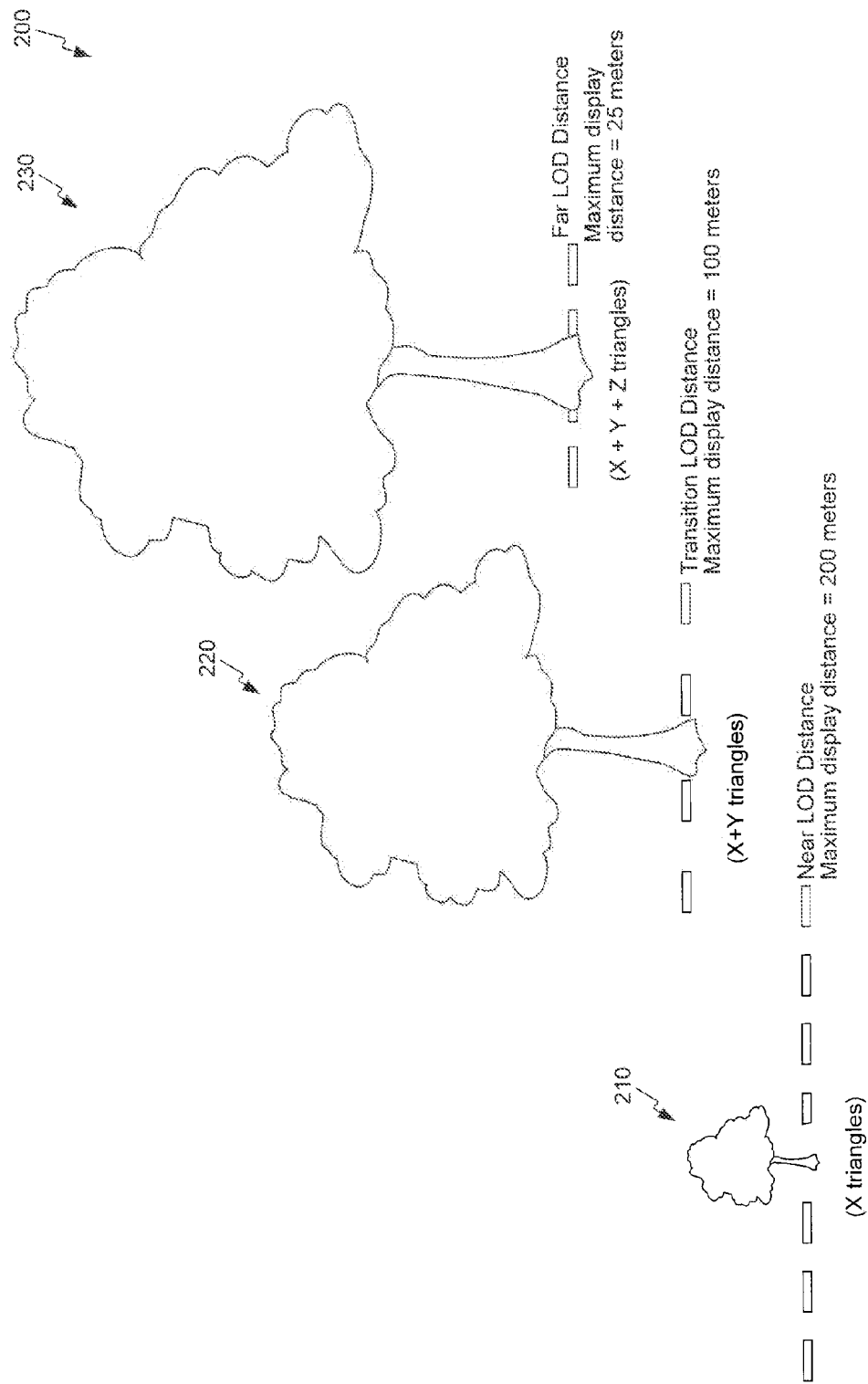
FIG. 2 shows an illustration of an exemplary tree model having three different LODs.

FIG. 2 shows an illustration of an exemplary tree model 200 having three different LODs. Different LODs of tree model 200 may be displayed depending on a distance between the virtual camera and the tree instance. A range may be defined by associating a maximum display distance (e.g., in meters from the viewpoint) with each LOD of a model at which the tree instance is visible. A maximum display distance may be defined, for example, by the model data.

The different LOD instances to display may include a relatively higher resolution model and a relatively lower resolution model. It typically takes longer to render a higher resolution model compared to a lower resolution model. The displayed LOD instance of the model may be based in two-dimensional space. For example, a decision to render the lower resolution model versus the higher resolution model may be based on a distance between a location of the virtual camera and the instance. This determination may include or may disregard altitude.

In an embodiment, the LOD data is predefined when the model is built. Tree model 200 includes LOD distances corresponding to different LODs of tree model 200. Based on determining a location of the virtual camera and the LOD information, an appropriate LOD instance is rendered.

In an embodiment, the LOD information is included in the model data. For example, exemplary tree model 200 may be the pine tree model in collection 110. The model data included in the collection may be the pine tree model and additional data. The additional data may include three different LODs for tree model 200. Tree model 200 includes a first LOD instance 210 at a first LOD, a second LOD instance 220 at a second LOD, and a third LOD instance 230 at a third LOD.

First LOD instance 210 may be visible at a relatively far distance compared to second LOD instance 220 and third LOD instance 230. First LOD instance 210 may represent a simplified representation of tree model 200. First LOD instance 210 may be used when the virtual camera is located at a maximum display distance of 200 meters from the instance. First LOD instance 210 is displayed when the virtual camera is located within, for example, a first range between 100-200 meters from the instance. The first range may not include 100 meters but may include 200 meters. Accordingly, if the virtual camera is located farther than 200 meters from the instance, first LOD instance 210 is not displayed.

When the virtual camera gets closer (e.g., when the user zooms in on the view), a user may see finer details of the tree than that shown in first LOD instance 210. Second LOD instance 220 may represent a semi-detailed representation of tree model 200. Second LOD instance 220 may be visible at a transition LOD distance of 100 meters. Second LOD instance 220 may be used when the virtual camera is located at a maximum display distance of 100 meters from the instance. As such, first LOD instance 210 may be replaced by second LOD instance 220 when the virtual camera is located at 100 meters. Second LOD instance 220 is displayed when the virtual camera is located within, for example, a second range between 25-100 meters from the instance. The second range may not include 25 meters but may include 100 meters. Accordingly, if the virtual camera is located farther than 100 meters from the instance, second LOD instance 220 is not displayed.

When the virtual camera gets closer than 100 meters, a user may see finer details of the tree than that shown in second LOD instance 220. Third LOD instance 230 may represent a detailed representation of tree model 200. Third LOD instance 230 may be visible at a near LOD distance of 25 meters.

Third LOD instance 230 may be used when the virtual camera is located at a maximum display distance of 25 meters from the instance. As such, second LOD instance 220 may be replaced by third LOD instance 230 when the virtual camera is located at 25 meters. Third LOD instance 230 is displayed when the virtual camera is located within, for example, a third range between 0-25 meters from the instance. The third range may not include 0 meters but may include 25 meters. Accordingly, if the virtual camera is located farther than 25 meters from the instance, third LOD instance 230 is not displayed.

The finer the LOD of a model, the longer it may take to process the model at that LOD. For example, it may take X triangles to render first LOD instance 210, (X+Y) triangles to render second LOD instance 220, and (X+Y+Z) triangles to render third LOD instance 230. In an embodiment, first instance 210 is a billboard model that includes a small amount of geometry data and some texture data. A billboard model has a flat mesh and is oriented towards the virtual camera. Billboard models may be collected into a single batch to render and are fairly cheap to render. Second LOD instance 220 may be a blend of billboard model and three-dimensional model data. Three-dimensional models have more detail than billboard models and are typically more expensive to render compared to billboard models. Three-dimensional models may be rendered individually and may be expensive to render. Third LOD instance 230 may be a three-dimensional model.

In an embodiment, selecting which LOD instance of a model to display includes determining a camera distance from a location of the virtual camera to a location specified by the instance set. A maximum display distance is identified at which a first LOD instance of the model is visible. The maximum display distance may be a maximum distance at which the first LOD instance is visible from the location of the virtual camera. It is determined whether the camera distance is greater than the maximum display distance. When it is determined that the camera distance is not greater than the maximum display distance, the first LOD instance of the model is displayed at the specified location. When it is determined that the camera distance is greater than the first maximum display distance, a second LOD instance of the model is displayed at the specified location. The first LOD instance of the model has a higher resolution than the second LOD instance of the model.

B. Dynamic LOD Distance

In an embodiment, an LOD distance is determined dynamically. In this embodiment, a default distance at which to render a particular LOD instance may be overridden by the dynamically determined LOD distance. For example, using the example above, second LOD instance 220 is rendered when the virtual camera is located within the second distance range 25-100 meters. The LOD distance may be overridden and a different distance range used to determine which LOD instance to display.

This may be advantageous when the final set of data to be rendered to a screen is dense. The LOD distance is a distance that separates a low resolution LOD instance from a high resolution LOD instance. The LOD distance may be used as the dynamically determined LOD distance. The LOD distance may be determined to limit a time period needed to render the instances at different LODs for a model. A field of view of a virtual camera may change in different situations and different rendering modes. As virtual camera 310 moves around, an LOD distance adjusts so objects in a frame may be rendered within the time budget.

An image rendered at a display device is called a frame. The rendering may be divided into equal-size flame periods. A frame period may depend on such factors as the operation of the graphics hardware and display devices. A deadline occurs when the display device reads data from a frame buffer. This read is synchronized to the update rate of the display device. For example, if a display device's update rate is set to 60 Hertz (e.g., 60 frames per second), the frame periods of the frames are 16.67 milliseconds in length. If the virtual camera has a dense instance set within the field of the view of the virtual camera, the processing and issuing of a draw call for the replicated instances may easily exceed the 16.67 millisecond time budget. If objects are not processed within the 16.67 millisecond time budget, frames may skip, resulting in a less than enjoyable user experience.

1. LOD Distance Separates Different LOD Instances

Figure 3:
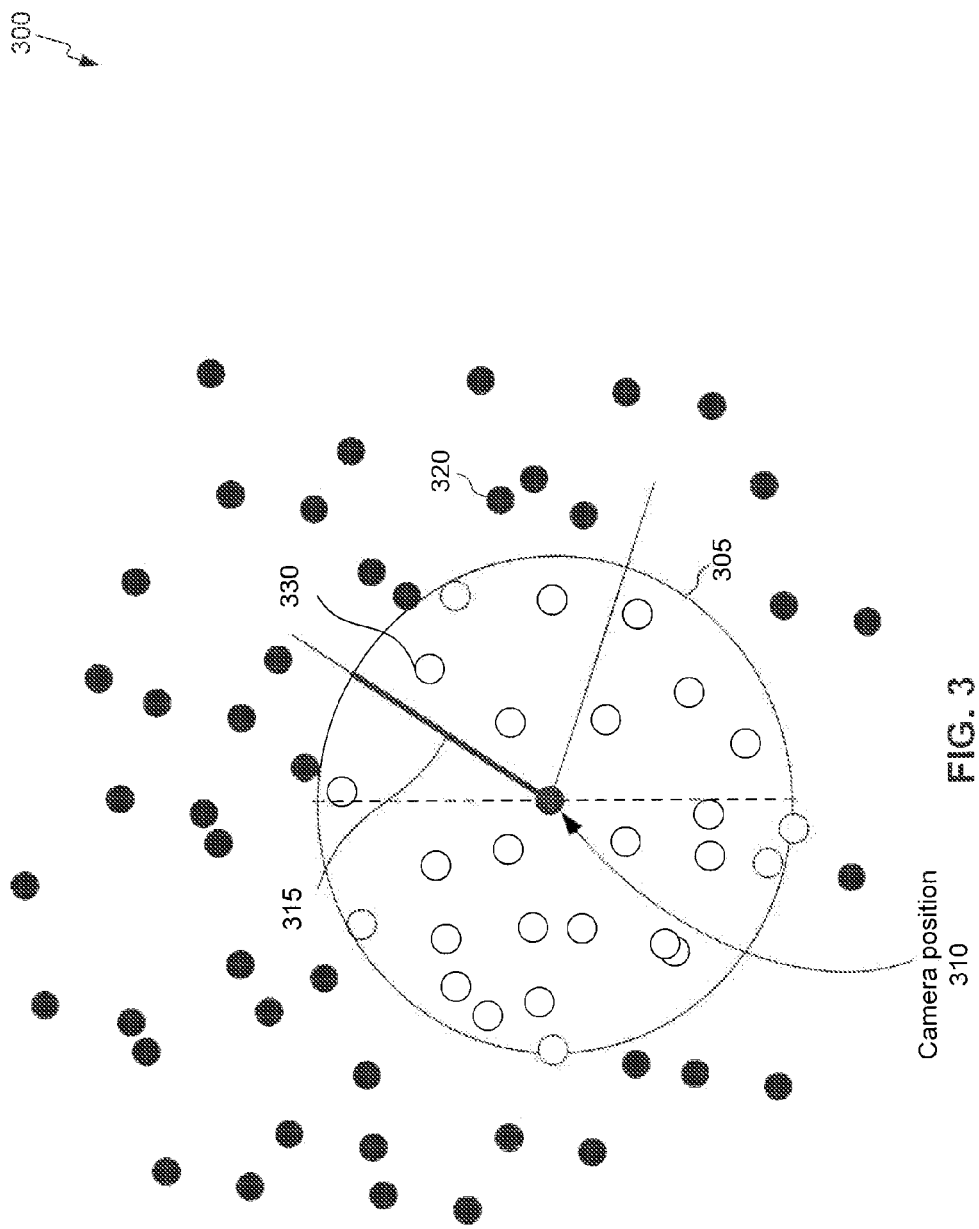
FIG. 3 shows an illustration including a boundary between two different LODs, according to an embodiment.

FIG. 3 shows an illustration 300 including a boundary 305 between two different LODs, according to an embodiment. A person skilled in the relevant art will appreciate that an embodiment may be extended to more than two different LODs.

An LOD distance 315 is represented by a line segment starting from a location of a virtual camera 310 to a boundary 305 that separates instances at the first LOD from instances at the second LOD. The instances shown in illustration 300 may represent, for example, instance set 115 in node 105a. First LOD instances are represented by the filled circles (e.g., instance 320), and second LOD instances are represented by the non-filled circles (e.g., instance 330). Instance 320 is farther from a location of virtual camera 310 compared to instance 330. Accordingly, first LOD instance 320 may have a lower resolution than second LOD instance 330. Similarly, second LOD instance 330 is closer to a location of virtual camera 310 compared to first LOD instance 320. Accordingly, second LOD instance 330 may have a higher resolution than first LOD instance 320. As such, it typically takes more resources to display second LOD instance 330 compared to first LOD instance 320.

When a distance from the location of the virtual camera to a location of an instance is less than LOD distance 315, the instance is rendered in the frame at the second LOD. Accordingly, second LOD instance 330 may be displayed. When a distance from the location of the virtual camera to a location of the instance is not less than LOD distance 315, the instance is rendered in the frame at the first LOD. Accordingly, first LOD instance 320 may be displayed. A person skilled in the relevant art will appreciate that an embodiment may make different comparisons. For example, in another embodiment, when a distance from the location of the virtual camera to a location of an instance is greater than LOD distance 315, the instance is rendered in the frame at the first LOD. And when a distance from the location of the virtual camera to a location of the instance is not greater than LOD distance 315, the instance is rendered in the frame at the second LOD.

In an embodiment, when the maximum number of instances at the second LOD has been rendered in the frame period, instances are only rendered at the first LOD. It this embodiment, even if the instance is close to virtual camera 310, the instance may still be displayed at the first LOD. This may enable the objects to be rendered within the frame period and reduce frame skips.

A node may include a dense instance set such that instances in the node may be tightly packed in front of virtual camera 310. In an embodiment, a node in a node tree including an instance set is identified. The first node is located within a field of view of a virtual camera that defines a perspective to view content of a three-dimensional environment. The instance set may reference a model having two different LODs. A first LOD and a second LOD of the model may be identified. An LOD distance may be determined from a location of the virtual camera to a boundary that separates an instance at a first LOD from an instance at a second LOD.

In an embodiment, an LOD distance may be based at least on a maximum number of instances at the higher resolution LOD (e.g., second LOD) to render in a frame period and an estimated density of a scene. An estimated density of the scene may include a sum of the instance densities of each node included in the scene. For example, determining an estimated density of a scene including a particular node may include determining an estimated density of the instance set in the particular node.

It an embodiment, an LOD distance satisfies an equation:

$$\text{LOD Distance} = \sqrt{\frac{2I_{max}}{\rho\pi}}, \quad (1)$$

where Imax is the maximum number of instances at the higher resolution LOD to render in a frame period, and where ρ is the density of the scene.

In Equation (1), ρ may be the estimated density of the entire scene (e.g., all visible nodes in the scene).

Equation (1) determines an LOD distance by determining a number of instances in the semicircle. Equation (1) takes into consideration a 180 degree field of view and determines the area of a semicircle. As shown, the field of view of virtual camera 310 is less than 180 degrees. Accordingly, equation (2) may be modified to take into account a smaller angle.

2. Maximum Number of Instances at Higher Resolution LOD

A view of a geographic information environment may display thousands of detailed replicated instances. For example, if a user views the Amazon forest closely, thousands of trees at a high resolution may be displayed. Due to resource budgets, the specified number of trees may not be drawn within a frame period. This may cause frames to skip, resulting in a distorted view for the user.

A maximum number of relatively higher LOD instances to display in a frame may be defined. In an embodiment, a maximum number of instances at the higher resolution LOD to render in a frame period may be determined by the graphics hardware and display device. The maximum number of high-resolution models to be rendered in a frame may be identified such that there is a high likelihood that a number of high-resolution models up to the maximum number of high-resolution models budgeted will be drawn without skipping frames. It is desirable for the instances to be rendered in a frame within the time budget.

3. Density (ρ)

Instances are three-dimensional objects that take up a certain amount of space. The density of an instance set in the node may be determined in a variety of ways.

In an embodiment, a density of instances in a node is estimated. The estimated density is a number of instances per unit area. In an embodiment, density is a measurement of a number of instances per unit area in a node $$\left(e.g., \left(\frac{\text{instances}}{meter^2}\right)\right).$$

In another embodiment, density is a measurement of mass per volume in a node. For example, a number of fish within a volume of water can be determined.

In an embodiment, the estimated density of a given instance set is included in the data in the node (e.g., model data). For example, the density may be estimated in a preprocessing phase and sent to the client.

In another embodiment, the client estimates the density of an instance set in the node. To determine the estimated density of a given instance set in the node, the client may determine a size of the node. The client may determine an area in the node, determine a number of instances within the area, and divide the number of instances by the area. This may provide a rough estimate of the density of instance sets in the node.

In an embodiment, an area of a node satisfies an equation:

$$\text{Area} = \left(\frac{R}{2^L}\right)^2, \quad (2)$$

where R is the Earth's mean radius at the equator, and where L is a depth of the node.

The area in Equation (2) may provide an estimated area of the node.

Multiple instance sets may contribute to the screen. Consequently, a sum of the densities of instance sets in different nodes may be used to determine the LOD distance.

Further, an instance's location outside the field of view of the virtual camera can still contribute pixels or some information to the view. For example, a tree canopy may be inside the field of view while the trunk of the tree is outside the field of view of the virtual camera. It may be desirable to determine which instances contribute to the scene and to only take these instances into account.

In an embodiment, a maximum LOD distance is specified. This may be advantageous in low instance set density situations in which an LOD distance can inflate out to infinity (e.g., max=200 meters) and high resolution models may be drawn at unintended locations.

IV. Exemplary Client Architecture

Figure 4:
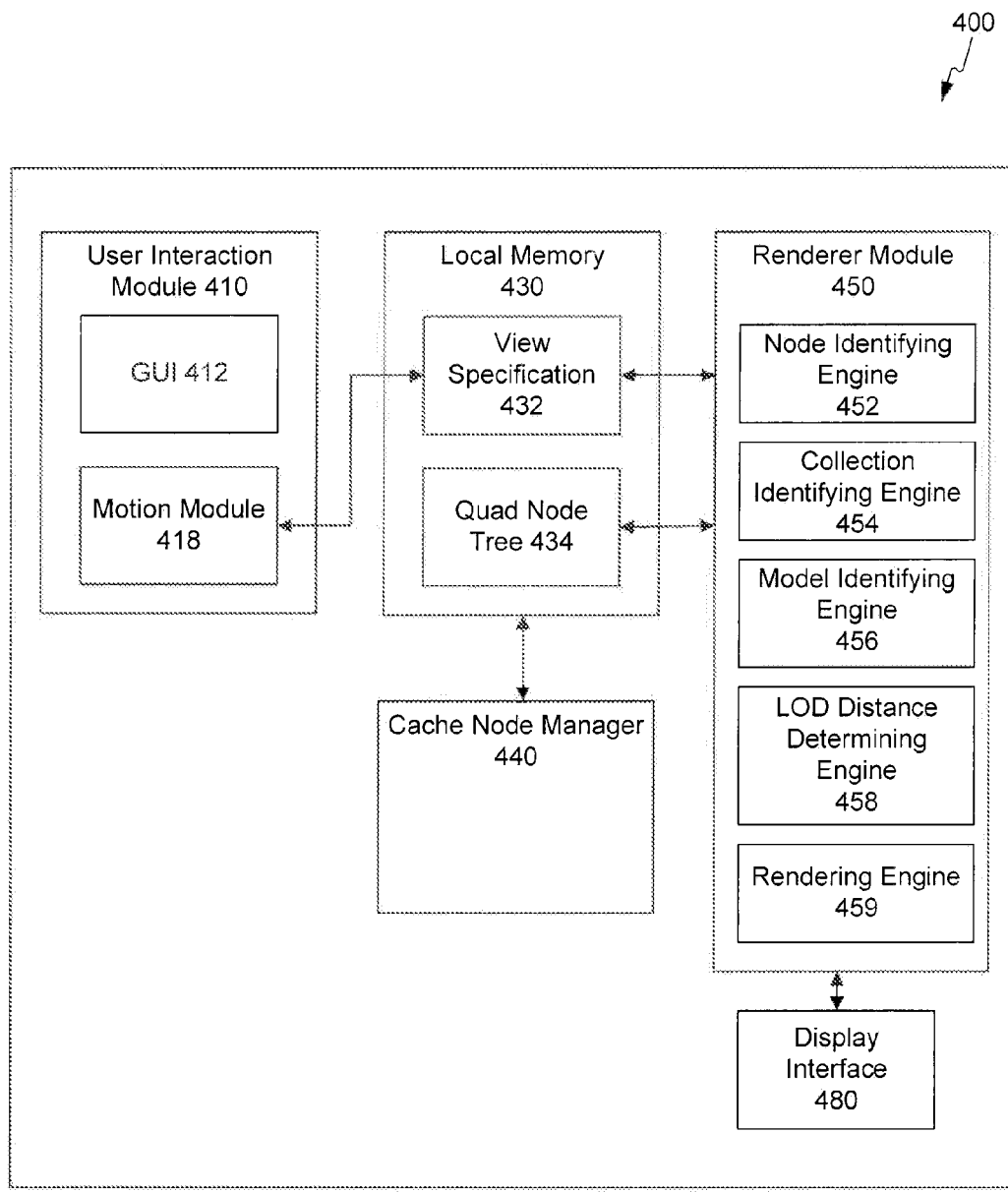
FIG. 4 shows an architecture diagram of an exemplary client of a GIS.

FIG. 4 shows an architecture diagram of an exemplary client 400 of a GIS, according to an embodiment. In an embodiment, client 400 includes a user interaction module 410, local memory 430, cache node manager 440, renderer module 450, and display interface 480. Components in client 400 may include more or fewer than the components shown.

In an embodiment, the components of client 400 can be implemented, for example, as software running on a client machine. Client 400 interacts with a GIS server (not shown) to bring images of the Earth and other geospatial data to client 400 for viewing by a user. Together, the images of the Earth and other geospatial data form a three-dimensional model in a three-dimensional environment. In an embodiment, software objects are grouped according to functions that can run asynchronously (e.g., time independently) from one another.

User interaction module 410 includes a graphical user interface (GUI) 412 and motion module 418. Local memory 430 includes a view specification 432 and quad node tree 434.

In an embodiment, client 400 operates as follows. User interaction module 410 receives user input regarding a location that a user desires to view and, through motion module 418, constructs view specification 432. In an embodiment, a user inputs location information using GUI 412. This results, for example, in the generation of view specification 432. View specification 432 defines a virtual camera's viewable volume within a three-dimensional space, known as a frustum, and the position and orientation of the frustum with respect, for example, to a three-dimensional map. View specification 432 is placed in local memory 430, where it is used by renderer module 450. In an embodiment, renderer module 450 uses view specification 432 to render data for display.

In an embodiment, cache node manager 440 builds a quad node tree 434 by populating it with quad nodes based on view specification 432. In an embodiment, cache node manager 440 identifies which cache nodes are needed from the server to resolve a review and requests these cache nodes.

Renderer module 450 includes a node identifying engine 452, collection identifying engine 454, model identifying engine 456, LOD distance determining engine 458, and rendering engine 459.

According to an embodiment, node identifying engine 452 identifies nodes in a tree. Node identifying engine 452 may identify a first node in a node tree including an instance set. The first node may be needed to resolve a view and may be located within a field of view of a virtual camera that defines a perspective to view content of a three-dimensional environment. Node identifying engine 452 also identifies a second node in the node tree including a collection referenced by the instance set. Collection identifying engine 454 identifies a collection referenced by the instance set.

Model identifying engine 456 identifies a model in the collection. The model is referenced by the instance set and the instance set includes location data for replicated instances in the instance set.

Rendering engine 459 displays the node including the instance set by displaying model data in the collection at the locations specified by the instance set. For example, rendering engine 459 may display a replicated instance at locations specified by the instance set.

In an embodiment, client 400 may select which LOD instance of a model to display if a model includes different LODs. Model identifying engine 456 identifies a first LOD and a second LOD of a model referenced by an instance set in a node. The second LOD has a higher resolution than the first LOD. LOD distance determining engine 458 determines an LOD distance between two LODs. LOD distance determining engine 458 identifies a maximum number of instances at the second LOD to render in a frame period and determines an estimated density of a scene including the node. LOD distance determining engine 458 determines an LOD distance from a location of a virtual camera to a boundary that separates an instance at the first LOD from an instance at the second LOD. The LOD distance is based at least or the maximum number of instances and the estimated density of the scene. The LOD distance may limit a time period needed to render the instances at the first and second LODs.

When a distance from the location of the virtual camera to a location of a first instance is less than the LOD distance, rendering engine 459 renders in a frame period the instance at the second LOD. When a distance from the location of the virtual camera to a location of the first instance is not less than the LOD distance, rendering engine 459 renders in the frame period the instance at the first LOD. When the maximum number of instances at the second LOD has been rendered in the frame period, rendering engine 459 renders instances only at the first LOD.

Display interface 480 (e.g., a display interface card) is configured to allow data to be sent to a display associated with the user's computer, so that the user can view the data. Display interface 480 can be implemented with conventional technology. Client 400 may request nodes in node tree 100 from a server and display the nodes in a three-dimensional environment.

Note that in alternative embodiments, any subset of the components shown in FIG. 4 may in fact be embodied as a single component. For example, the functionalities of node identifying engine 452 and collection identifying engine 454 may be combined in a single device or module. Other combinations of the functional components of FIG. 4 are also possible, as would be known to a person of skill in the art.

V. Preprocess Node Tree

Figure 5:
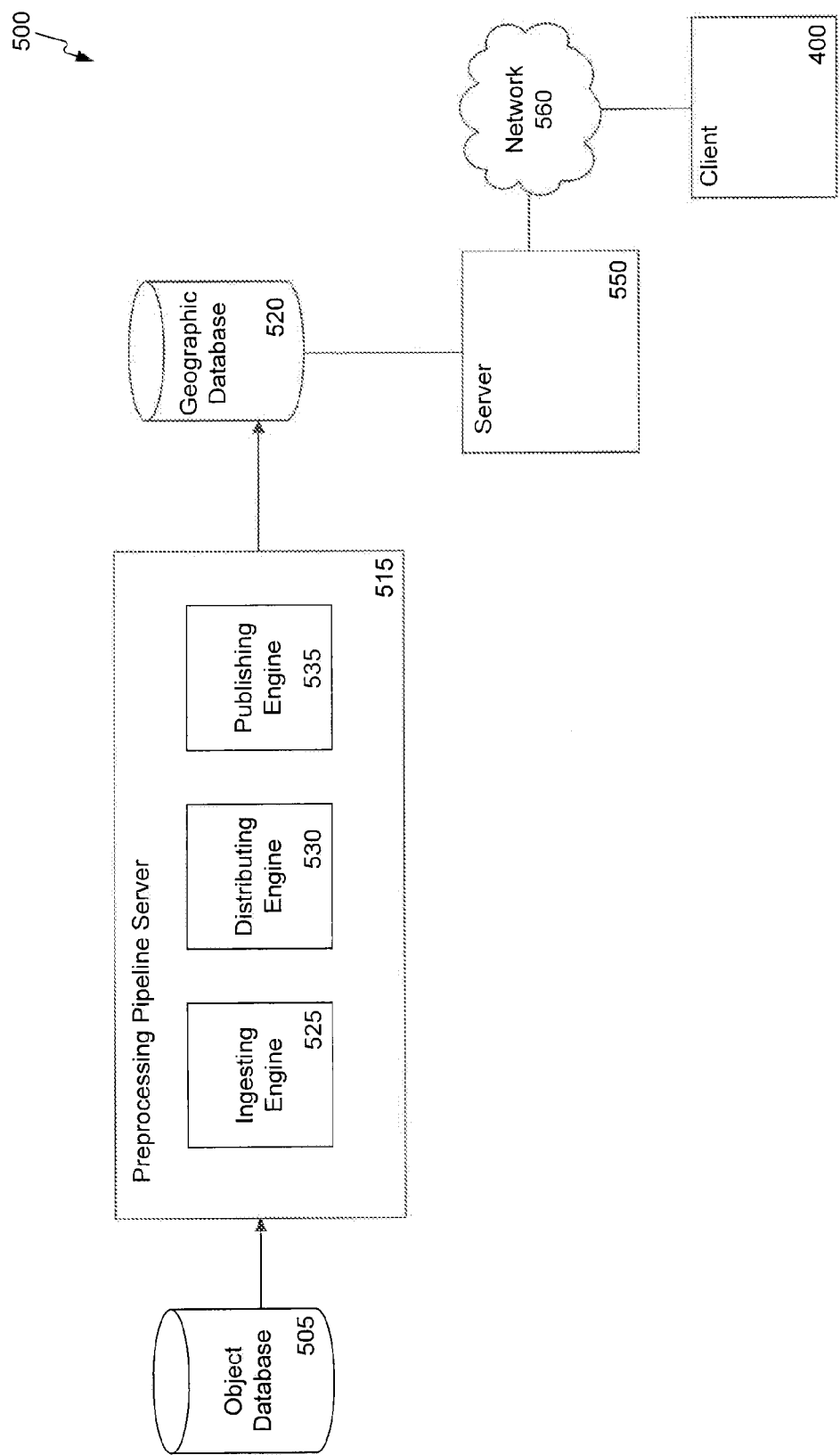
FIG. 5 shows an architecture diagram of an exemplary system for publishing replicated geographic data in a node tree for display in a three-dimensional environment.

FIG. 5 shows an architecture diagram of an exemplary system 500 for publishing replicated geographic data in a node tree for display in a three-dimensional environment. System 500 includes an object database 505. Object database 505 may include model data and instance data. The model data may include, for example, geometry and texture data for an associated model.

In an embodiment, the model and instance data are served to a client for display to a user. In an embodiment, object database 505 is a third-party database.

Object database 505 is coupled to a preprocessing pipeline server 515, which is further coupled to a geographic database 520. Preprocessing pipeline server 515 includes an ingesting engine 525, a distributing engine 530, and a publishing engine 535.

In general, system 500 operates as follows. Preprocessing pipeline server 515 receives model and instance data from object database 505. In an example, preprocessing pipeline server 515 may retrieve the data, for example, using an SQL select statement. In another example, object database 505 may push the data to preprocessing pipeline server 515 to reduce processing work.

1. Ingestion

In an embodiment, when data is received by preprocessing pipeline server 515, ingesting engine 525 ingests the data in object database 505. The ingested data may be used to create collection, model, and instance data that is published to a node tree for streaming to a client (e.g., client 400).

Ingesting engine 525 may read the input data in a variety of forms such that objects may be determined.

In an embodiment, ingesting engine 525 ingests instances, each instance including instance location and a reference to a geographic model to be displayed at the instance location. In an example, ingesting engine 525 may also determine a model of the tree and include a model index in the instance data referencing the model in a collection. For example, if a city has multiple tree models, ingesting engine 525 may determine that a particular tree is a pine tree compared to, for example, an elm tree. If ingesting engine 525 determines that the tree is a pine tree in collection 110 (see FIG. 1), then ingesting engine 525 can include an index 0 in the instance set such that an instance refers to the pine tree model (e.g., Model [0]).

In another example, ingesting engine 525 may determine a rotation about an x-axis or y-axis of trees. In another example, ingesting engine 525 may determine a scale or size of a model.

2. Distribution

Distributing engine 530 determines a location to store the information in the node tree. For example, distributing engine 530 may determine a level in a node tree to store instances and which in nodes at the level to store the instances.

Distributing engine 530 determines which levels to store instances. Distributing engine may determine a node level based on a size of a model referenced by the instance. For example, distributing engine 530 may determine which levels to store instances based on a distance at which the model is visible at a display of a client device. The distance at which the model is visible at the display of the client device may be based on, for example, a minimum size in pixels for an instance to become visible at the display of the client device. For example, given a minimum of five pixels for an object to become visible, distributing engine 530 may determine a distance from a location of the virtual camera at which the object is 5 pixels. Once this is determined, distributing engine 530 may determine at which node tree level to store the instance. The smaller an object is, the greater a depth a node in a node tree may be that includes the object. For example, a car instance may be at level 14 in the node tree and a fire hydrant instance may be at level 17.

In an embodiment, distributing engine 530 places instance sets in nodes relative to a geographic location of the objects. For example, distributing engine 530 may determine a location in the Earth node tree to place an instance set based on, for example, latitude and longitude coordinates of the objects.

Distributing engine 530 distributes the instances to a set of nodes in the node tree at the corresponding LOD. If a node includes too many instances, the system (e.g., client 400) processing the node may be overwhelmed. To overcome this issue, distributing engine 530 may redistribute instances. For example, distributing engine 530 may determine whether a number of instances in a first node in a node tree at a first level exceeds an instance threshold. If it is determined that the number of instances exceeds the instance threshold, distributing engine 530 may redistribute the instances in the first node to one or more nodes in the node tree.

Redistributing the instances may include pushing one or more instances in the first node to a second node in the node tree at a second level. A depth in the node tree of the second level is lower than a depth in the node tree of the first level. In an embodiment, the instances that are pushed down to the second node may be selected randomly. In another embodiment, the instances that are pushed down to the second node are selected based on, for example, a size of the instance.

Distributing engine 530 may redistribute instances in a loop. For example, the first node along with other nodes may push instances down to the second node. If this occurs, the second node may be overwhelmed with instances and the second node may be redistributed.

Once the instances are included in the node tree at their appropriate levels, distributing engine 530 may determine where in the node tree to generate a collection that is referenced by the instances. For example, referring back to FIG. 1, node 105a includes instance set 115 and node 105b includes instance set 120. To determine an appropriate level to generate a collection for these instances, distributing engine 530 may determine an ancestor node in the node tree for node 105a and node 105b. From node 105a and node 105b, distributing engine 530 may determine a level in the node tree that is a union of node 105a and node 105b and create a collection node at the determined level. For example, distributing engine 530 may generate a collection in node 104, node 103b, node 102b, or node 101. For example, node 102b may include data that is a union of the data included in nodes 105a and 105b. The generated collection may be referenced by the ancestor node in the node tree. The collection may include geographic models referenced by one or more nodes, where instances in the one or more nodes reference one or more models in the collection.

Distributing engine 530 may distribute the collection to the appropriate nodes in the node tree at their appropriate levels. Nodes may include multiple collections depending on the particular instances that reference the node. Node 102b may also include other collections different from a tree collection. For example, node 102b may include a collection "Trees" and "Signs." Instance set 120 may include data about signs. Distributing engine 530 may generate a "Sign" collection that includes, for example, a stop sign model and a yield sign model. Both of these collections may be referenced by instance sets in different nodes.

A tradeoff may be made between including an appropriate level at which to store collections in the node tree. Distributing engine 530 may limit the number of models per collection. As a result, distributing engine 530 may include collections at greater depth levels in the node tree. However, collections at smaller depth levels in the node tree may be streamed less compared to collections at greater depth levels in the node tree.

Distributing engine 530 may pack multiple instances into an instance set. In an embodiment, the instances in the instance set are sorted based on a model they reference.

3. Publish

Publishing engine 535 publishes the node tree with the collection and the instances. Publishing engine 535 may store node tree data in geographic database 520.

The collection and instances may be streamed to a client (e.g., client 400) for display in a geographic information environment. In an embodiment, publishing engine 535 divides models into data packets to be streamed to a client. Publishing engine 535 may also pack instances into an instance set to be streamed to the client.

In an embodiment, instances in an instance set are sorted based on a corresponding model and are streamed based on the sorting. For example, instance sets may be streamed to a client based on a model referenced by instances. For example, a streamed instance set may indicate a quantity of 25 pine tree instances rather than stream 25 pine tree instances that reference a model index of 0 (see FIG. 1). In this way, instance sets referencing the pine tree model may be streamed without including model index 0. By not streaming model index 25 different times, the quantity of bytes streamed may be reduced.

In an embodiment, publishing engine 535 creates data structures including the collection, model, and instance data that are streamed to a client.

As shown in FIG. 1, system 500 also includes client 400. Client 400 communicates with one or more servers 550, for example, across network(s) 560. For example, client 400 may request nodes including collection and instance sets from one or more servers 550 and the one or more servers 550 may stream the collection and the instances to client 400 for display.

Client 400 may be a general-purpose computer. Alternatively, client 400 may be a specialized computing device such as, for example, a mobile handset. Similarly, server 550 may be implemented using any computing device capable of serving data to client 400.

Network 560 may be any network or combination of networks that may carry data communication, and may be referred to herein as a computer network. Such network 560 may include, but is not limited to, a local area network, medium area network, and/or wide area network such as the Internet. Network 560 may support protocols and technology including, but not limited to, World Wide Web protocols and/or services. Intermediate web servers, gateways, or other servers may be provided between components of system 500 depending upon a particular application or environment.

In an embodiment, each of object database 505 and geographic database 520 may be implemented on a relational database management system. Examples of relational databases include Oracle, Microsoft SQL Server, and MySQL. These examples are illustrative and are not intended to be limiting. In another embodiment, each of object database 505 and geographic database 520 may be implemented on a non-relational database management system. Examples of non-relational database management systems include a file system.

Each of ingesting engine 525, distributing engine 530, publishing engine 535, and other components may be implemented in hardware, software, firmware or any combination thereof.

Embodiments of preprocessing pipeline server 515 and server 550, or portions thereof, may also be implemented as computer-readable code executed on one or more computing devices capable of carrying out the functionality described herein. Further, processing pipeline server 515 (and its component modules 525-535) may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware may include, but is not limited to, a processor, memory and graphical user interface display. The computing device may also have multiple processors and multiple shared or separate memory components. For example, the computing device may be a clustered computing environment or server farm

4. Other Embodiments

Note that in alternative embodiments, any subset of the components shown in FIG. 5 may in fact be embodied as a single component. For example, the functionalities of ingesting engine 525 and distributing engine 530 may be combined in a single device or module. Other combinations of the functional components of FIG. 5 are also possible, as would be known to a person of skill in the art.

Further, processing pipeline server 515 may have more or fewer than the components shown in FIG. 5. For example, in an embodiment, processing pipeline server 515 includes a distributing engine that distributes instances and a different distributing engine that generates collections.

Ingesting engine 525, distributing engine 530, and publishing engine 535 may reside on a same machine or different machines. If ingesting engine 525, distributing engine 530, and publishing node 535 reside on different machines, this may enable parallel processing and efficiency and may provide for scalability.

For example, a first distributing engine may be located on a first machine and a second distributing engine may be located on a second machine. The first machine may be a physical machine different from the second machine. In this example, tasks may be distributed to multiple machines having their own set of memory. For example, instance sets included in the same node may be sent and processed to a first machine while instance sets included in a different node may be sent and processed to a second machine different from the first machine. For example, after an initial layer of processing, instance sets included in a first node may be sent to the first distributing engine on the first machine for processing and instance sets included in a second node may be sent to the second distributing engine on the second machine for processing.

IV. Geographic Data—Coarse and Fine Levels

The published node tree may enable retrieval of models at relatively coarser levels of the node tree and retrieval of replicated instances at relatively finer levels of the node tree.

A node tree may include geographically localized information. For example, the location of nodes in node tree 100 may be based on geographic locations associated with geographic data in the nodes. Node tree 100 may include collections corresponding to different parts of the world in different intermediate nodes. For example, because Antarctica does not have trees, an instance set in a node representing Antarctica may not reference collection 110 named "Trees."

Collection data in a node tree may contain the bulk of renderable data in the node tree. It may be preferable to place the collection and model data at a relatively coarse level in the node tree compared to nodes including instance data. This may reduce the number of times a collection is streamed. Accordingly, a depth of nodes including the collection and model data may be located at relatively smaller depths compared to a depth of nodes including an instance set.

A set of models from different parts of the world may be displayed in different intermediate nodes in node tree 100. For example, the model data may be included in nodes at, for example, levels 1-17. Models may be served in a broad area of the Earth. For example, if a forest is displayed and the model data is at a relatively small depth in the node tree, a small quantity of nodes (e.g., 2 nodes) may be displayed to cover the entire forest. Consequently, the model may be served once for the entire forest.

As a location of a virtual camera gets closer to the forest, trees may start coming into view at finer levels. For example, as the location of the virtual camera gets closer to the forest, the displayed view of the entire forest may be 1000 trees. As the location of the virtual camera gets even closer, another 1000 trees may become visible. Instances may be pushed down in the node tree to be included in nodes at relatively greater depths. For example, instance sets may be included in nodes at, for example, levels 10-17

V. Exemplary Methods

Figure 6:
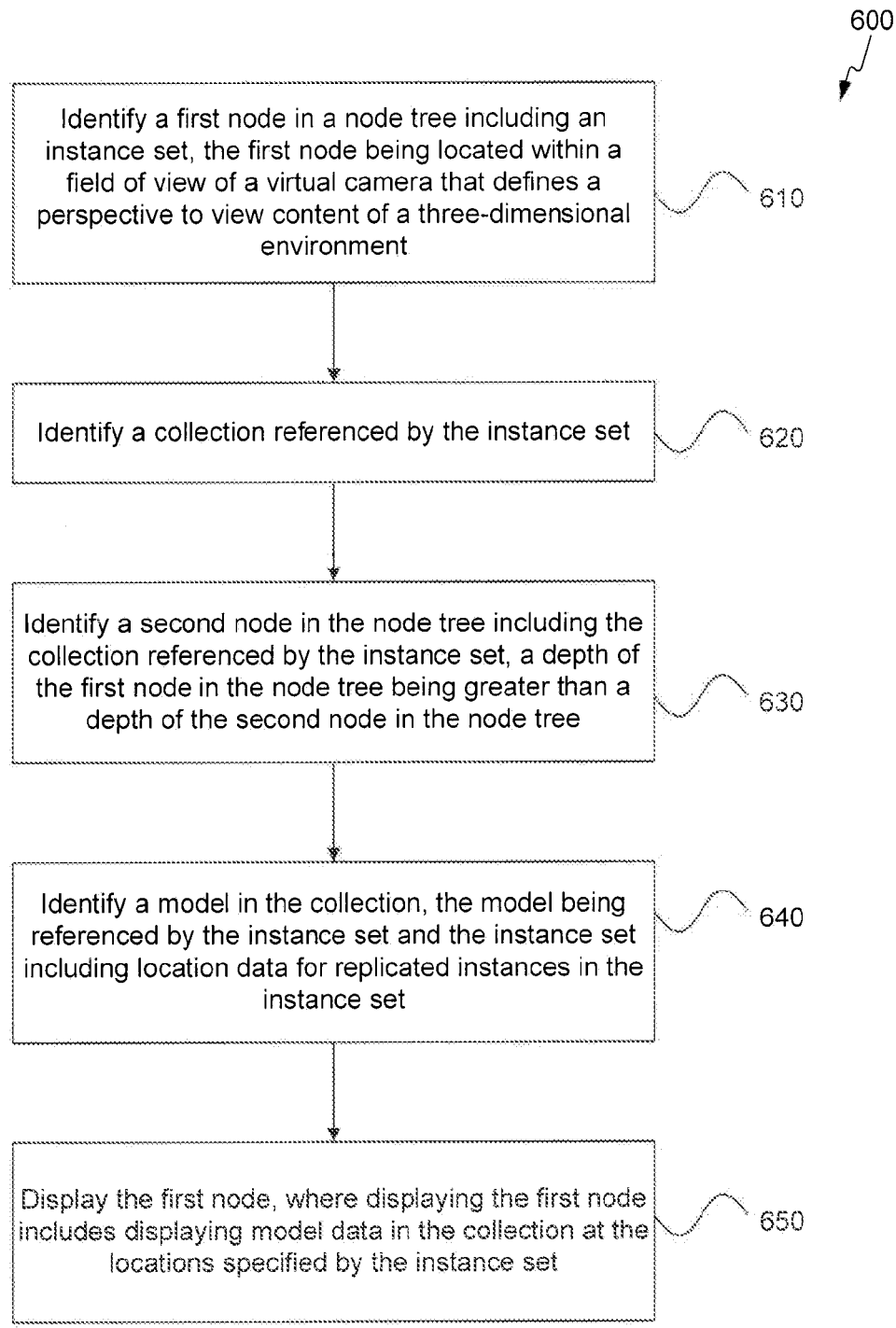
FIG. 6 shows a flowchart of a method for displaying replicated geographic data in a three-dimensional environment, according to an embodiment.
Figure 7:
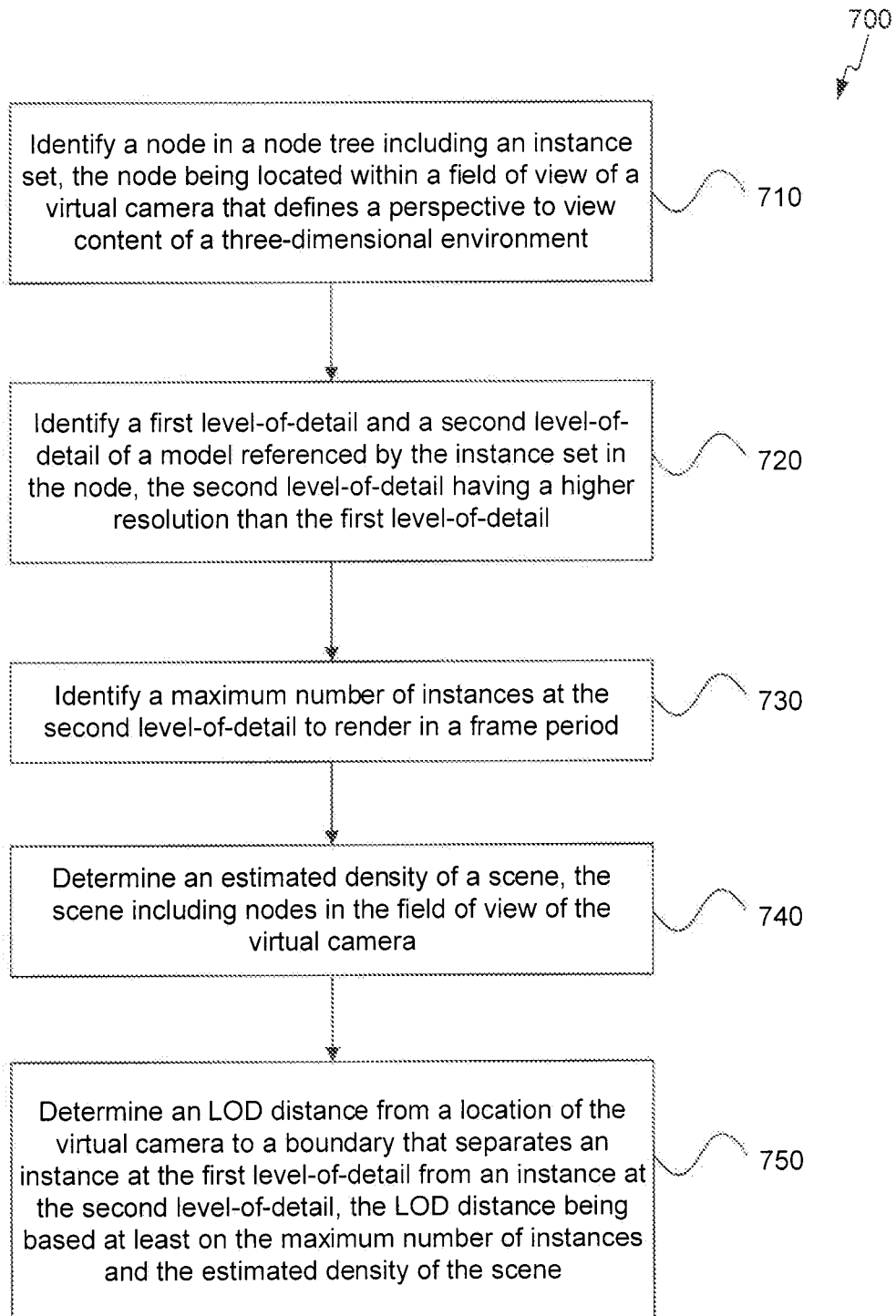
FIG. 7 shows a flowchart of another method for displaying geographic data in a three-dimensional environment, according to an embodiment.

FIG. 6 shows a flowchart of a method 600 for displaying replicated geographic data in a three-dimensional environment, according to an embodiment. FIG. 7 shows a flowchart of another method 700 for displaying geographic data in a three-dimensional environment, according to an embodiment. Methods 600 and 700 may be used in operation of client 400 in FIG. 4. Although methods 600 and 700 are described with respect to client 400, it is not meant to be limited to client 400.

In FIG. 6, at stage 610, a first node in a node tree is identified including an instance set, the first node being located within a field of view of a virtual camera that defines a perspective to view content of a three-dimensional environment. For example, node identifying engine 452 may identify a first node in a node tree including an instance set, the first node being located within a field of view of a virtual camera that defines a perspective to view content of a three-dimensional environment.

At stage 620, a collection referenced by the instance set is identified. For example, collection identifying engine 454 may identify a collection referenced by the instance set.

At stage 630, a second node in the node tree is identified including the collection referenced by the instance set, a depth of the first node in the node tree being greater than a depth of the second node in the node tree. For example, node identifying engine 452 may identify a second node in the node tree including the collection referenced by the instance set, a depth of the first node in the node tree being greater than a depth of the second node in the node tree.

At stage 640, a model in the collection is identified, the model being referenced by the instance set and the instance set including location data for replicated instances in the instance set. For example, model identifying engine 456 may identify a model in the collection, the model being referenced by the instance set and the instance set including location data for replicated instances in the instance set.

At stage 650, the first node is displayed, where displaying the first node includes displaying model data in the collection at the locations specified by the instance set. For example rendering engine 454 may display the first node, where displaying the first node includes displaying model data in the collection at the locations specified by the instance set.

In FIG. 7, at stage 710, a first node in a node tree is identified including an instance set, the first node being located within a field of view of a virtual camera that defines a perspective to view content of a three-dimensional environment. For example, node identifying engine 452 may identify a first node in a node tree including an instance set, the first node being located within a field of view of a virtual camera that defines a perspective to view content of a three-dimensional environment.

At stage 720, a first level-of-detail and a second level-of-detail of a model referenced by the instance set in the first node are identified, the second level-of-detail having a higher resolution than the first level-of-detail. For example, model identifying engine 456 may identify a first level-of-detail and a second level-of-detail of a model referenced by the instance set in the first node, the second level-of-detail having a higher resolution than the first level-of-detail.

At stage 730, a maximum number of instances at the second level-of-detail to render in a frame period is identified. For example, LOD distance determining engine 458 may identify a maximum number of instances at the second level-of-detail to render in a frame period.

At stage 740, an estimated density of a scene is determined, the scene including nodes in the field of the view of the virtual camera. For example, LOD distance determining engine 458 may determine an estimated density of a scene, the scene including nodes in the field of the view of the virtual camera.

At stage 750, an LOD distance is determined from a location of the virtual camera to a boundary that separates an instance at the first level-of-detail from an instance at the second level-of-detail, the LOD distance being based at least on the maximum number of instances identified at stage 730 and the estimated density of the scene determined at stage 740. For example, LOD distance determining engine 458 may determine an LOD distance from a location of the virtual camera to a boundary that separates an instance at the first level-of-detail from an instance at the second level-of-detail, the LOD distance being based at least on the maximum number of instances and the estimated density of the scene.

Figure 8:
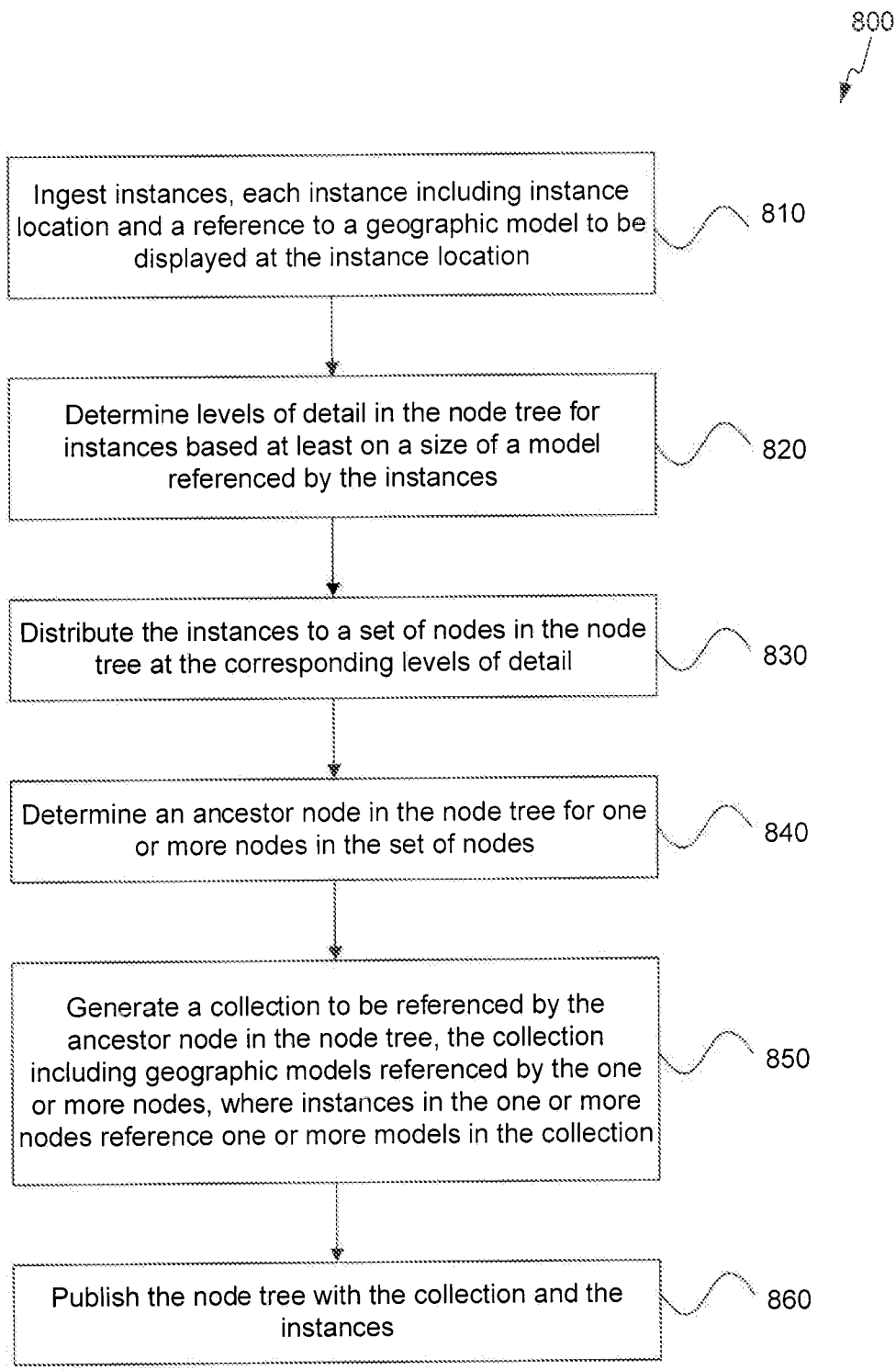
FIG. 8 shows a flowchart of a method for publishing nodes to a node tree for display in a three-dimensional environment, according to an embodiment.

FIG. 8 shows a flowchart of a method 800 for publishing nodes to a node tree for display in a three-dimensional environment, according to an embodiment. Method 800 may be used in operation of system 500 in FIG. 5. Although method 800 is described with respect to system 500, it is not meant to be limited to system 500.

At stage 810, instances are ingested, each instance including an instance location and a reference to a geographic model to be displayed at the instance location. For example, ingesting engine 525 may ingest instances, each instance including instance location and a reference to a geographic model to be displayed at the instance location.

At stage 820, levels of detail in the node tree are determined for instances based at least on a size of a model referenced by the instances. For example, distributing engine 530 may determine levels of detail in the node tree for instances based at least on a size of a model referenced by the instances.

At stage 830, instances are distributed to a set of nodes in the node tree at the corresponding levels of detail determined at stage 820. For example, distributing engine 520 may distribute the instances to a set of nodes in the node tree at the corresponding levels of detail determined at stage 820.

At stage 840, an ancestor node in the node tree is determined for one or more nodes in the set of nodes. For example, distributing engine 530 may determine an ancestor node in the node tree for one or more nodes in the set of nodes.

At stage 850, the node tree is published with the collection and the instances. For example, publishing engine 535 may publish the node tree with the collection and the instances. The published node tree may enable retrieval of models at relatively coarser levels of the node tree and retrieval of replicated instances at relatively finer levels of the node tree.

VIII. Conclusion

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A computer-implemented method for displaying replicated geographic data in a three-dimensional environment, comprising:

identifying, by one or more computing devices, a first node in a node tree including an instance set, the first node being located within a field of view of a virtual camera that defines a perspective to view content of the three-dimensional environment, wherein the instance set comprises a plurality of instances of a replicated object respectively associated with a plurality of locations associated with the first node;

identifying, by the one or more computing devices, a collection referenced by the instance set, the collection including a plurality of models, and wherein one of the plurality of models is associated with each of the plurality of instances;

identifying, by the one or more computing devices, a second node in the node tree including the collection referenced by the instance set, a depth of the first node in the node tree being greater than a depth of the second node in the node tree;

identifying, by the one or more computing devices, in the collection the model associated with each of the plurality of instances, wherein the model in the collection in the second node has multiple representations at different levels-of-detail;

determining, by the one or more computing devices for each of the plurality of instances, which of the different levels-of-detail of the model to use based at least in part on a distance between the virtual camera and the location associated with such instance; and displaying, by the one or more computing devices, the first node, wherein displaying the first node comprises displaying at the respective determined levels-of-detail model data in the collection at each of the plurality of locations respectively associated with the plurality of instances.

2. The method of claim 1, wherein determining, by the one or more computing devices, for each of the plurality of instances which of the different levels-of-detail of the model to use based at least in part on a distance between the virtual camera and the location associated with such instance comprises:

determining, by the one or more computing devices for each of the plurality of instances, a camera distance from a location of the virtual camera to the location associated with such instance;

identifying, by the one or more computing devices, a maximum display distance at which a first level-of-detail instance of a model is visible;

determining, by the one or more computing devices for each of the plurality of instances, whether the camera distance is greater than the maximum display distance;

for each instance for which the camera distance is determined to be not greater than the maximum display distance, displaying, by the one or more computing devices for each of the plurality of instances, the first level-of-detail instance of the model; and for each instance for which the camera distance is determined to be greater than the first maximum display distance, displaying, by the one or more computing devices, a second level-of-detail instance of the model, wherein the first level-of-detail instance of the model has a higher resolution than the second level-of-detail instance of the model.

3. The method of claim 1, wherein the plurality of locations comprise respective latitude and longitude coordinates of the plurality of instances in the instance set.

4. The method of claim 1, wherein the instance set references an index of the model in the collection.

5. The method of claim 1, wherein the instance set includes an altitude, a scale, and z-rotation data for each of the plurality of instances in the instance set.

6. The method of claim 1, wherein the first node cannot be rendered without referencing data in another node.

7. The method of claim 1, wherein the second node is an ancestor of the first node and identifying the second node includes traversing the node tree from the first node up to the second node.

8. The method of claim 1, wherein a location of the nodes in the node tree is based on a geographic location associated with the data in the nodes.

9. The method of claim 1, wherein the first node does not include the model having multiple representations at different levels-of-detail.

10. The method of claim 9, wherein the node tree includes additional nodes and the additional nodes do not include the model having multiple representations at different levels-of-detail.

11. A system for displaying replicated geographic data in a three-dimensional environment, comprising:

a node identifying engine configured to:
(i) identify a first node in a node tree including an instance set, the first node being located within a field of view of a virtual camera that defines a perspective to view content of the three-dimensional environment, wherein the instance set comprises a plurality of instances of a replicated object respectively associated with a plurality of locations associated with the first node; and
(ii) identify a second node including a collection referenced by the instance set in the node tree, a depth of the first node in the node tree being greater than a depth of the second node in the node tree, wherein the collection includes a plurality of models, and wherein one of the plurality of models is associated with each of the plurality of instances;

a collection identifying engine configured to identify the collection referenced by the instance set;

a model identifying engine configured to identify the model associated with each of the plurality of instances in the collection, wherein the model in the collection in the second node has multiple representations at different levels-of-detail;

a level-of-detail determining engine configured to determine for each of the plurality of instances which of the different levels-of-detail of the model to use based at least in part on a distance between the virtual camera and the location associated with such instance; and a rendering engine configured to display the first node and to display at the respective determined levels-of-detail model data in the collection at each of the plurality of locations respectively associated with the plurality of instances.

12. The system of claim 11, wherein the level-of-detail determining engine is configured to:
(i) determine, for each of the plurality of instances, a camera distance from a location of the virtual camera to the location associated with such instance;
(ii) identify a maximum display distance at which a first level-of-detail instance of the model is visible; and
(iii) determine, for each of the plurality of instances, whether the camera distance is greater than the maximum display distance, wherein the rendering engine is configured to:
(i) for each instance for which the camera distance is determined to be not greater than the maximum display distance, display the first level-of-detail instance of the model; and
(ii) for each instance for which the camera distance is determined to be greater than the first maximum display distance, display a second level-of-detail instance of the model, wherein the first level-of-detail instance of the model has a higher resolution than the second level-of-detail instance of the model.

13. The system of claim 11, wherein the plurality of locations comprise respective latitude and longitude coordinates of the plurality of instances in the instance set.

14. The system of claim 11, wherein the instance set references an index of the model in the collection respectively associated with each of the plurality of instances in the instance set.

15. The system of claim 11, wherein the instance set includes at least an altitude, a scale, and z-rotation data for each of the plurality of instances in the instance set.

16. The system of claim 11, wherein the rendering engine cannot render the first node without referencing data in another node.

17. The system of claim 11, wherein a location of the nodes in the node tree is based on a geographic location associated with the data in the nodes.

18. The system of claim 11, wherein the first node does not include the model having multiple representations at different levels-of-detail.

19. The system of claim 18, wherein the node tree includes additional nodes and the additional nodes do not include the model having multiple representations at different levels-of-detail.

20. An apparatus comprising at least one computer readable storage medium encoding instructions thereon that, in response to execution by a computing device, cause the computing device to perform operations comprising:
  identifying a first node in a node tree including an instance set, the first node being located within a field of view of a virtual camera that defines a perspective to view content of the three-dimensional environment, wherein the instance set comprises a plurality of instances of a replicated object respectively associated with a plurality of locations associated with the first node;
  identifying a collection referenced by the instance set, the collection including a plurality of models, and wherein one of the plurality of models is associated with each of the plurality of instances;
  identifying a second node including the collection referenced by the instance set in the node tree, a depth of the first node in the node tree being greater than a depth of the second node in the node tree;
  identifying in the collection the model associated with each of the plurality of instances, wherein the model in the collection in the second node has multiple representations at different levels-of-detail;
  determining for each of the plurality of instances which of the different levels-of-detail of the model to use based at least in part on a distance between the virtual camera and the location associated with such instance; and
  displaying the first node, wherein displaying the first node comprises displaying at the respective determined levels-of-detail model data in the collection at each of the plurality of locations respectively associated with the plurality of instances.

21. The apparatus of claim 20, wherein determining for each of the plurality of instances which of the different levels-of-detail of the model to use based at least in part on a distance between the virtual camera and the location associated with such instance comprises:
  determining for each of the plurality of instances a camera distance from a location of the virtual camera to the location associated with such instance;
  identifying a maximum display distance at which a first level-of-detail instance of a model is visible;
  determining for each of the plurality of instances whether the camera distance is greater than the maximum display distance;
  for each instance for which the camera distance is determined to be not greater than the maximum display distance, displaying the first level-of-detail instance of the model; and
  for each instance for which the camera distance is determined to be greater than the first maximum display distance, displaying a second level-of-detail instance of the model,
  wherein the first level-of-detail instance of the model has a higher resolution than the second level-of-detail instance of the model.

22. The apparatus of claim 20, wherein the plurality of locations comprise respective latitude and longitude coordinates of the plurality of instances in the instance set.

23. The apparatus of claim 20, wherein the instance set references an index of the model in the collection.

24. The apparatus of claim 20, wherein the instance set includes an altitude, a scale, and z-rotation data for each of the plurality of instances in the instance set.

25. The apparatus of claim 20, wherein the first node cannot be rendered without referencing data in another node.

26. The apparatus of claim 20, wherein a location of the nodes in the node tree is based on a geographic location associated with the data in the nodes.

27. The apparatus of claim 20, wherein the first node does not include the model having multiple representations at different levels-of-detail.

28. The apparatus of claim 27, wherein the node tree includes additional nodes and the additional nodes do not include the model having multiple representations at different levels-of-detail.

* * * * *